(12) United States Patent
Matte et al.

(10) Patent No.: US 11,133,548 B2
(45) Date of Patent: Sep. 28, 2021

(54) INTERFACE SEALING COMPONENT FOR A BATTERY COVER ASSEMBLY, AND RELATED SYSTEMS AND METHODS

(71) Applicant: Volvo Group Canada Inc., Sainte-Claire (CA)

(72) Inventors: François Matte, Quebec (CA); Jean-François Leclerc, Lévis (CA)

(73) Assignee: Volvo Group Canada Inc., Sainte-Claire (CA)

( * ) Notice: Subject to any disclaimer, the term of this patent is extended or adjusted under 35 U.S.C. 154(b) by 126 days.

(21) Appl. No.: 16/313,415

(22) PCT Filed: Jun. 27, 2016

(86) PCT No.: PCT/CA2016/000179
§ 371 (c)(1),
(2) Date: Dec. 26, 2018

(87) PCT Pub. No.: WO2018/000073
PCT Pub. Date: Jan. 4, 2018

(65) Prior Publication Data
US 2019/0165341 A1   May 30, 2019

(51) Int. Cl.
*H01M 50/183* (2021.01)
*H01M 50/15* (2021.01)
*H01M 50/20* (2021.01)
*H01M 50/166* (2021.01)
*H01M 50/543* (2021.01)

(52) U.S. Cl.
CPC ......... *H01M 50/183* (2021.01); *H01M 50/15* (2021.01); *H01M 50/166* (2021.01); *H01M 50/20* (2021.01); *H01M 50/543* (2021.01); *H01M 2220/20* (2013.01)

(58) Field of Classification Search
CPC ... H01M 2/08; H01M 2/1077; H01M 2220/20
See application file for complete search history.

(56) References Cited

U.S. PATENT DOCUMENTS

| | | |
|---|---|---|
| 5,663,013 A | 9/1997 | Narukawa et al. |
| 6,312,851 B1 * | 11/2001 | Fukuda ............... H01M 50/112 429/176 |
| 8,168,323 B2 | 5/2012 | Richter et al. |
| 8,256,552 B2 | 9/2012 | Okada |
| 8,574,747 B2 | 11/2013 | Okada et al. |
| 2009/0038145 A1 * | 2/2009 | Kozu .................... H01M 2/348 29/623.2 |
| 2009/0095550 A1 | 4/2009 | Batdorff |
| 2010/0081041 A1 | 4/2010 | Okada et al. |
| 2011/0143179 A1 | 6/2011 | Nakamori |

OTHER PUBLICATIONS

International Search Report and Written Opinion for PCT/CA2016/000179, dated Mar. 14, 2017, 8 pages.

* cited by examiner

*Primary Examiner* — Ladan Mohaddes
(74) *Attorney, Agent, or Firm* — Withrow & Terranova, PLLC (57) ABSTRACT

An interface sealing component for enclosing electrical battery cable between a cover and an array of batteries includes a base member having a first side shaped to matingly engage a battery surface of one or more batteries. A second side of the interface sealing component is opposite the first side, and is shaped to matingly engage a battery cover so that the base member forms an interior volume between the battery surface and the battery cover. Each battery surface has at least one terminal disposed on the battery surface into the interior volume through a base aperture in the base member. In this manner, the interface sealing component and battery cover can seal a number of battery terminals from outside environmental conditions, such as dust, moisture, or chemical exposure that can damage the battery terminals and reduce the operating life of the battery.

19 Claims, 13 Drawing Sheets

INTERFACE SEALING COMPONENT FOR A BATTERY COVER ASSEMBLY, AND RELATED SYSTEMS AND METHODS

This application is a 35 USC 371 National Phase filing of International Application No. PCT/CA2016/000179, filed Jun. 27, 2016, the disclosure of which is incorporated herein by reference in its entirety.

FIELD OF THE DISCLOSURE

The present disclosure relates generally to battery cover assemblies, and more particularly to an interface sealing component for enclosing electrical battery cable between a cover and an array of batteries, and related systems and methods.

BACKGROUND

Batteries used in many commercial and industrial applications may be subjected to severe environmental conditions. For example, commercial vehicle batteries, such as batteries used in motor coaches, heavy trucks, and other large vehicles, may experience high levels of heat, humidity, and poor air quality over sustained periods. For example, it may be desirable for batteries to be located near a vehicle engine to increase power delivery efficiency to the engine and other vehicle systems, but many locations near the engine are subjected to increased levels of heat, dust, moisture, and chemical exposure, which can damage battery terminals and other components, thereby reducing the service life of the battery and increasing the probability of malfunction. Thus, there is a need in the art for a battery cover that protects the battery and its components from corrosion and other environmental hazards while permitting electrical interconnections between the batteries and other vehicle components.

SUMMARY

The present disclosure relates generally to battery cover assemblies, and more particularly to an interface sealing component for enclosing electrical battery cable between a cover and an array of batteries, and related systems and methods. In one embodiment, the interface sealing component for a battery comprises a base member having a first side shaped to matingly engage a battery surface of one or more batteries. A second side of the interface sealing component is shaped to matingly engage a battery cover so that the base member forms an interior volume between the battery surface and the battery cover. Each battery surface has at least one terminal disposed on the battery surface into the interior volume through a base aperture in the base member. In this manner, the interface sealing component and battery cover can seal a number of battery terminals from outside environmental conditions, such as dust, moisture, or chemical exposure that can damage the battery terminals and reduce the operating life of the battery.

Another advantage of this arrangement is that a single interface sealing component and battery cover can protect an array of multiple batteries. For large vehicle applications requiring multiple batteries, a single interface sealing component can be positioned over an array of batteries, and a single battery cover can be secured over the interface sealing component to protect the terminals and battery interconnects of the battery array. The use of an interface sealing component and battery cover also avoids the need for a battery box or other container that surrounds the entire battery array. This allows for improved heat dissipation by the batteries, because air is permitted to circulate around the batteries without exposing the terminals and interconnects to the undesirable environmental conditions.

According to one embodiment, an interface sealing component for a battery is disclosed. The interface sealing component comprises a base member having a first side and a second side opposite the first side, the first side having a first side surface shaped to conform to a complementary battery surface of a battery, the second side having a second side surface shaped to conform to a complementary surface of a battery cover, the base member shaped to form an interior volume between the battery surface and the battery cover. The interface sealing component further comprises a base aperture formed in the base member, the base aperture shaped to receive a terminal disposed on the battery surface therethrough to enclose the terminal in the interior volume.

According to another embodiment, a battery cover system is disclosed. The battery cover system comprises an interface sealing component. The interface sealing component comprises a base member having a first side and a second side opposite the first side. The base member forms an aperture. The battery cover system further comprises a battery. The battery comprises a battery surface matingly engaged with the first side of the interface sealing component. The battery further comprises a pair of terminals disposed on the battery surface through the base aperture. The battery cover system further comprises a battery cover matingly engaged with the second side of the interface sealing component. The interface sealing component, battery surface, and battery cover form an interior volume with the pair of terminals enclosed therein.

According to another embodiment, a method of sealing a battery interface between a battery and a battery cover is disclosed. The method comprises matingly engaging a first side of an interface sealing component over a battery surface. The method further comprises connecting an electrical component to a terminal on the battery surface. The method further comprises matingly engaging a battery cover over a second side of the interface sealing component to form an interior volume between the battery surface and the battery cover, wherein the terminal is enclosed in the interior volume and the electrical component extends at least partially outside the interior volume.

Those skilled in the art will appreciate the scope of the present disclosure and realize additional aspects thereof after reading the following detailed description of the preferred embodiments in association with the accompanying drawings.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first side" and "second side," and does not imply a priority, a type, an importance, or other attribute, unless otherwise stated herein.

The present disclosure relates generally to battery cover assemblies, and more particularly to an interface sealing component for enclosing electrical battery cable between a cover and an array of batteries, and related systems and methods. In one embodiment, the interface sealing component for a battery comprises a base member having a first side shaped to matingly engage a battery surface of one or more batteries. A second side of the interface sealing component is opposite the first side, and is shaped to matingly engage a battery cover so that the base member forms an interior volume between the battery surface and the battery cover. Each battery surface has at least one terminal disposed on the battery surface into the interior volume through a base aperture in the base member. In this manner, the interface sealing component and battery cover can seal a number of battery terminals from outside environmental conditions, such as dust, moisture, or chemical exposure that can damage the battery terminals and reduce the operating life of the battery.

Another advantage of this arrangement is that a single interface sealing component and battery cover can protect an array of multiple batteries. For large vehicle applications requiring multiple batteries, a single interface sealing component can be positioned over an array of batteries, and a single battery cover can be secured over the interface sealing component to protect the terminals and battery interconnects of the battery array. The use of an interface sealing component and battery cover also avoids the need for a battery box or other container that surrounds the entire battery array. This allows for improved heat dissipation by the batteries, because air is permitted to circulate around the batteries without exposing the terminals and interconnects to the undesirable environmental conditions.

Figure 1:
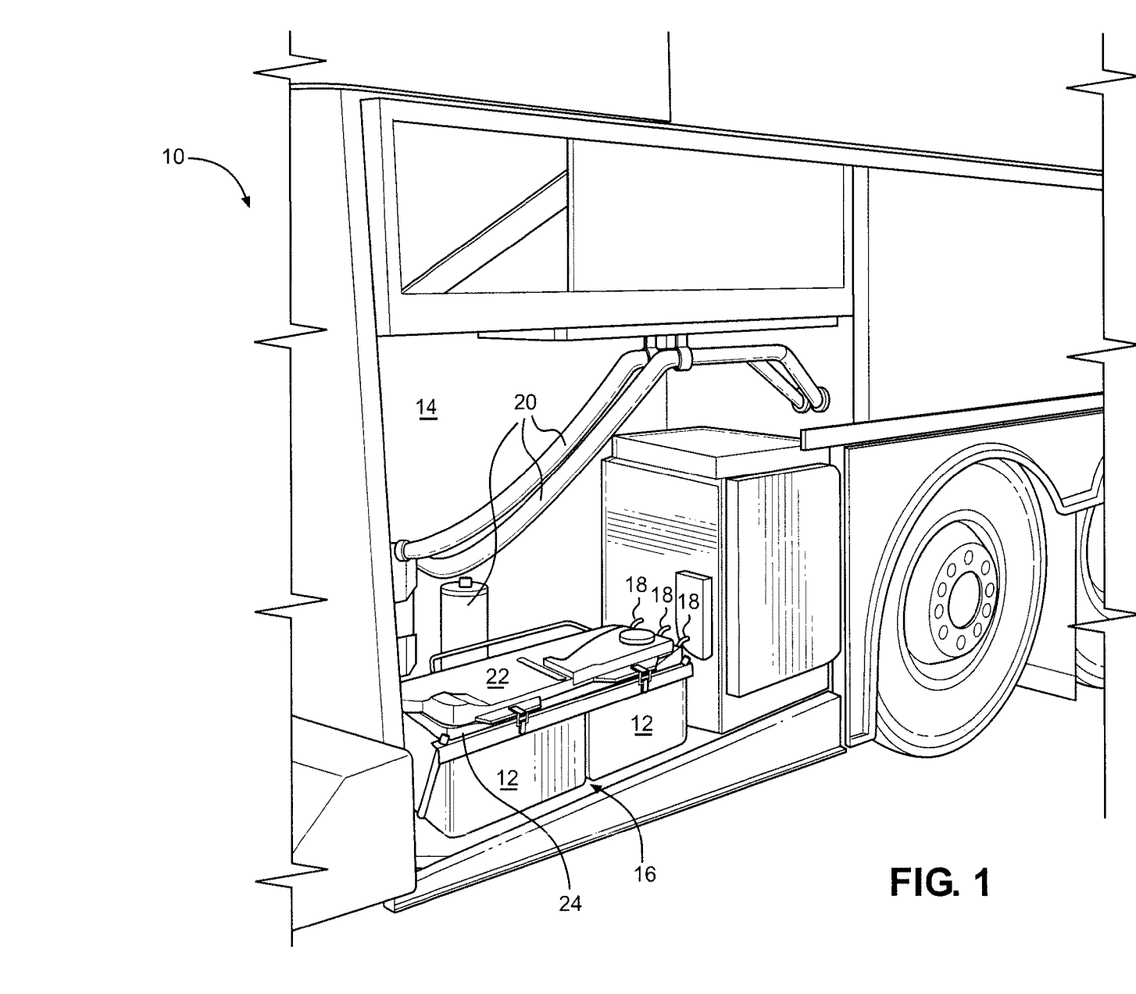
FIG. 1 is a perspective view of a motor coach electrical compartment having a battery interface assembly according to an embodiment.

In this regard, FIG. 1 is a perspective view of a vehicle 10 having a plurality of batteries 12 disposed in a battery compartment 14. The batteries 12 form part of a battery array assembly 16 for managing electrical cables 18 extending into the battery array assembly 16. In this embodiment, the battery compartment 14 may also house additional components 20 of the vehicle 10, such as an electrical junction box, additional cables, etc. As noted above, the battery compartment 14 may be subjected to harsh conditions including, but not limited to, high temperatures, moisture, dust exposure, and chemical exposure.

To protect the batteries 12, the battery array assembly 16 includes a battery array cover 22 (also referred to herein as a battery cover) disposed over the plurality of batteries 12, to shield the electrical cables 18 and battery components from the ambient environment of the battery compartment 14. The battery array assembly 16 further includes an interface sealing component 24 disposed between the batteries 12 and the battery array cover 22. The interface sealing component 24 is shaped to retain and manage the electrical cables 18, and to provide an environment seal between the batteries 12 and the battery array cover 22. This arrangement also has the advantage of protecting the contacts of the batteries 12 and electrical cables 18 without enclosing the batteries 12 in a dedicated enclosure. A dedicated enclosure, such as a dedicated battery box (not shown) and/or fan (not shown) may increase costs and add weight to the vehicle 10, and may also retain an unacceptable amount of heat by inhibiting dissipation of thermal energy produced by the batteries 12. For example, in this embodiment, a radiator fan (not shown) that circulates air through the entire electrical compartment 14 may be sufficient to cool the batteries 12, because the batteries 12 are not completely enclosed. Thus, by using a battery array assembly 16 according to this embodiment, the batteries 12 and electrical cables 18 may be shielded from the environment of the battery compartment 14 while also allowing the ambient air in the battery compartment 14 to provide ventilation and heat dissipation around the batteries 12.

Figure 2:
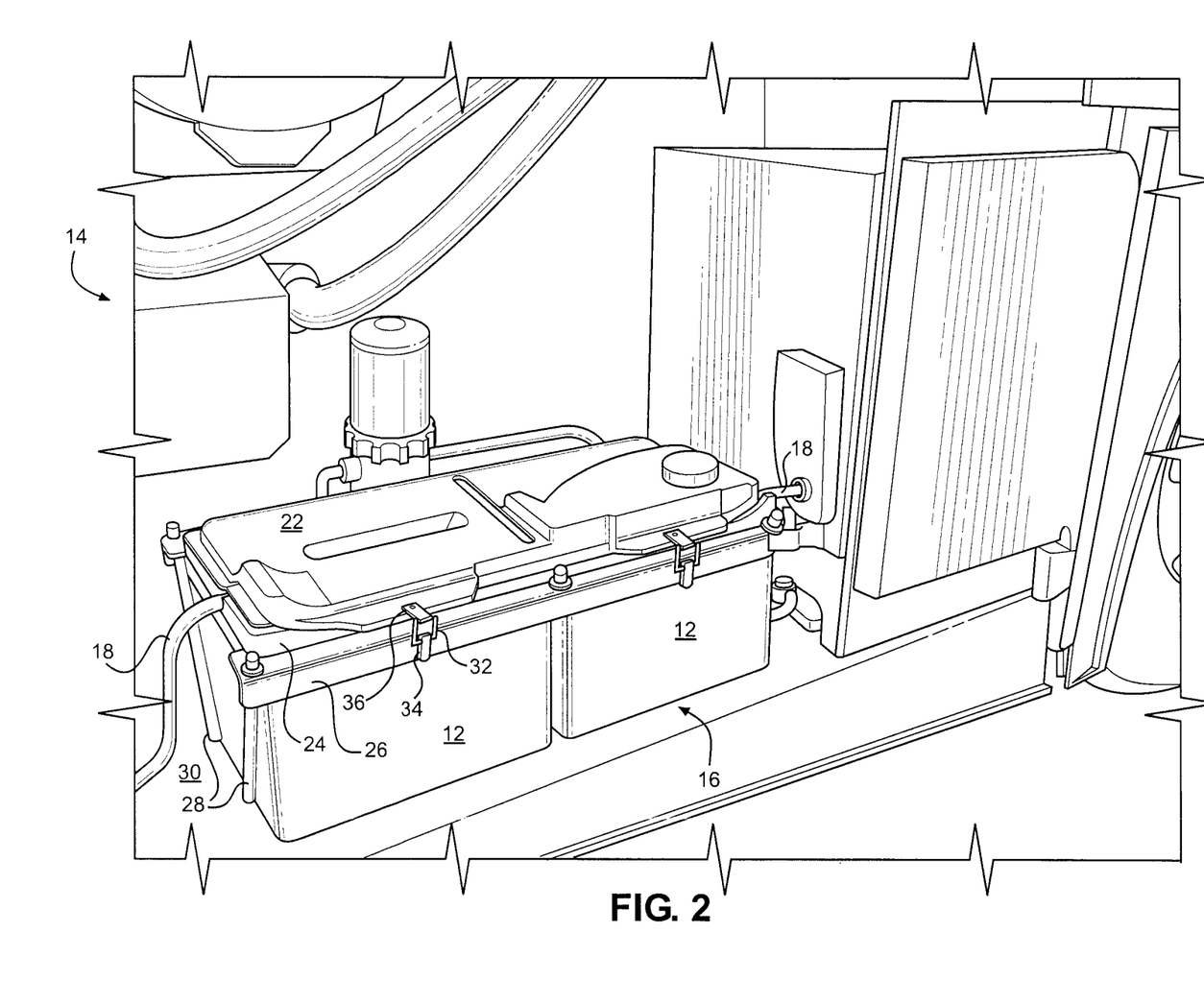
FIG. 2 is a detailed perspective view of the battery array assembly of FIG. 1.

In this regard, FIG. 2 is a detailed perspective view of the battery array assembly 16 of FIG. 1. In this embodiment, a two-by-two array of commercial grade vehicle batteries 12 is bounded by a pair of L-shaped hold-down brackets 26 extending longitudinally along opposite sides of the plurality of batteries 12. A plurality of hold-down bolts 28 is shaped to extend between the hold-down brackets 26 and a compartment bed 30, thereby securing the batteries 12 in place on the compartment bed 30 without inhibiting ventilation around the batteries 12 within the battery compartment 14. The interface sealing component 24 is disposed over the batteries 12 and the hold-down brackets 26. The battery array cover 22 is disposed over the interface sealing component 24, thereby engaging and compressing the interface sealing component 24 to form an environmental seal between with the batteries 12, the interface sealing component 24, and the battery array cover 22. In this embodiment, the battery array cover 22 is secured to the batteries 12 and/or the hold-down brackets 26 via one or more latch mechanisms 32. Each latch mechanism 32 may include a latch release 34 releasably coupled to a cover latch portion 36 of the battery array cover 22. It should be understood, however, that the battery array cover 22 can be secured over the interface sealing component 24 and batteries 12 by alternative mechanisms in place of, or in addition to, latch mechanisms 32.

Figure 3A:
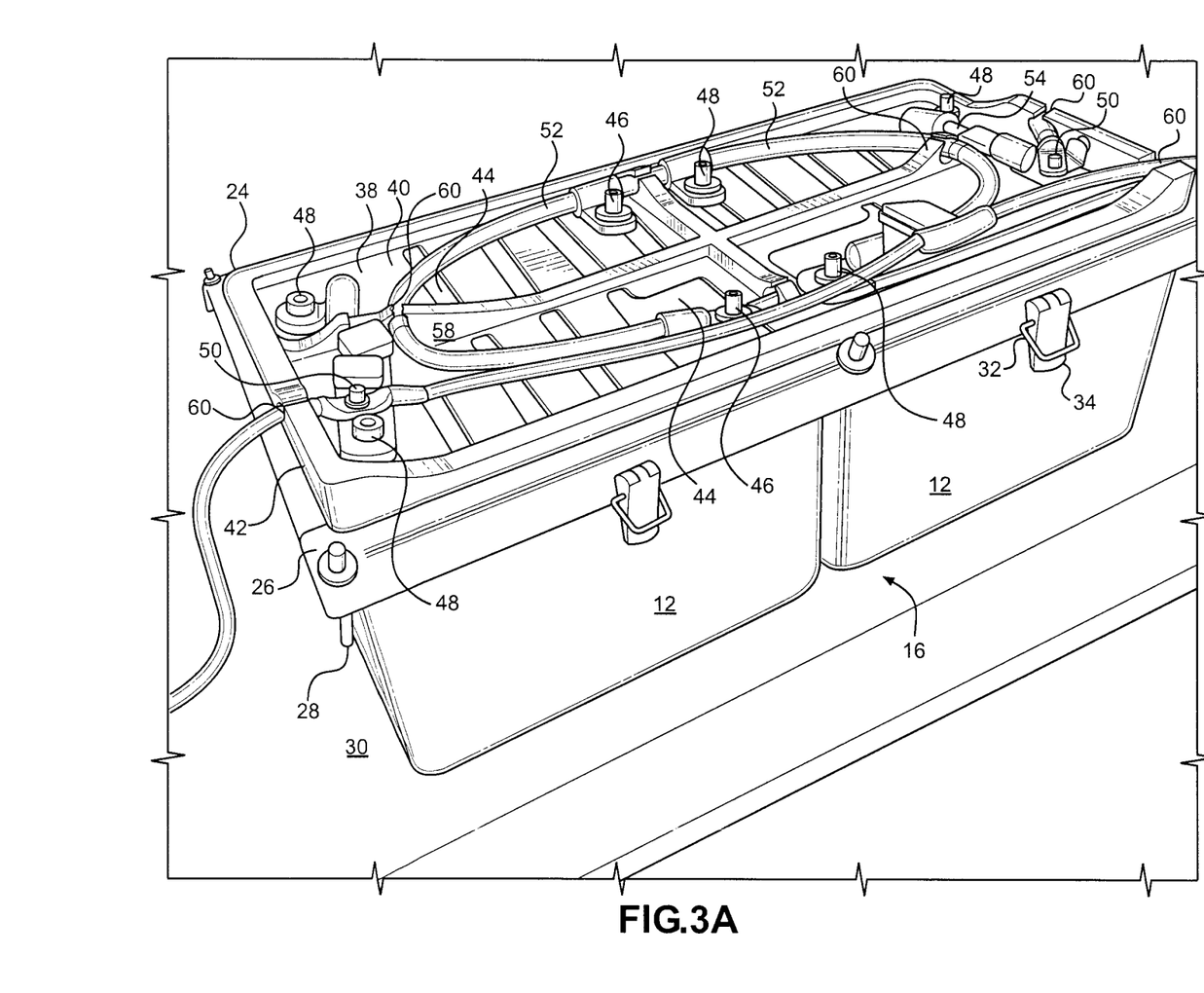
FIGS. 3A-3C are detailed perspective views of the battery array assembly of FIGS. 1 and 2 with the battery array cover removed to illustrate details of an interface sealing component shaped to be disposed between the battery array and the battery array cover.
Figure 3B:
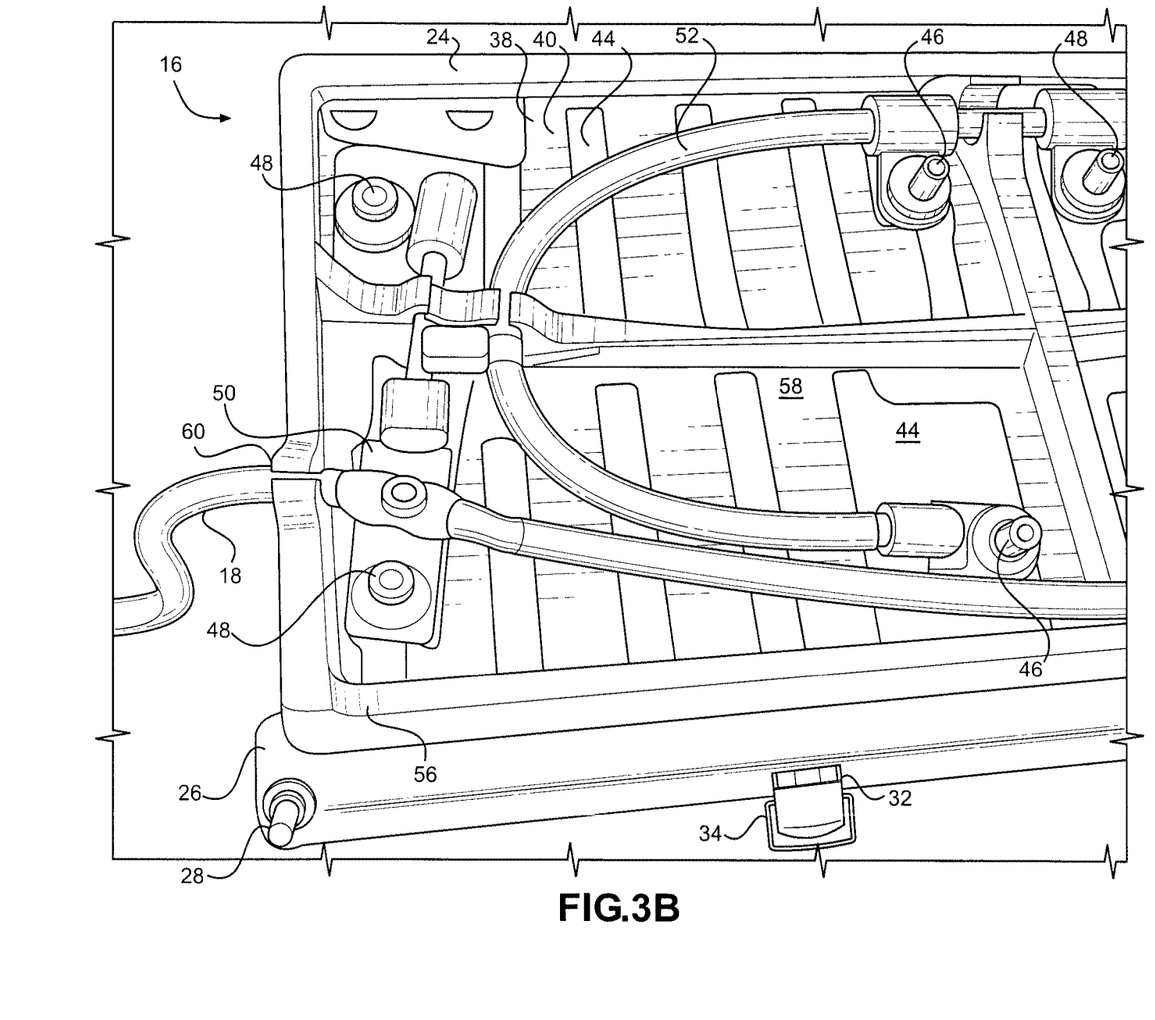
Figure 3C:
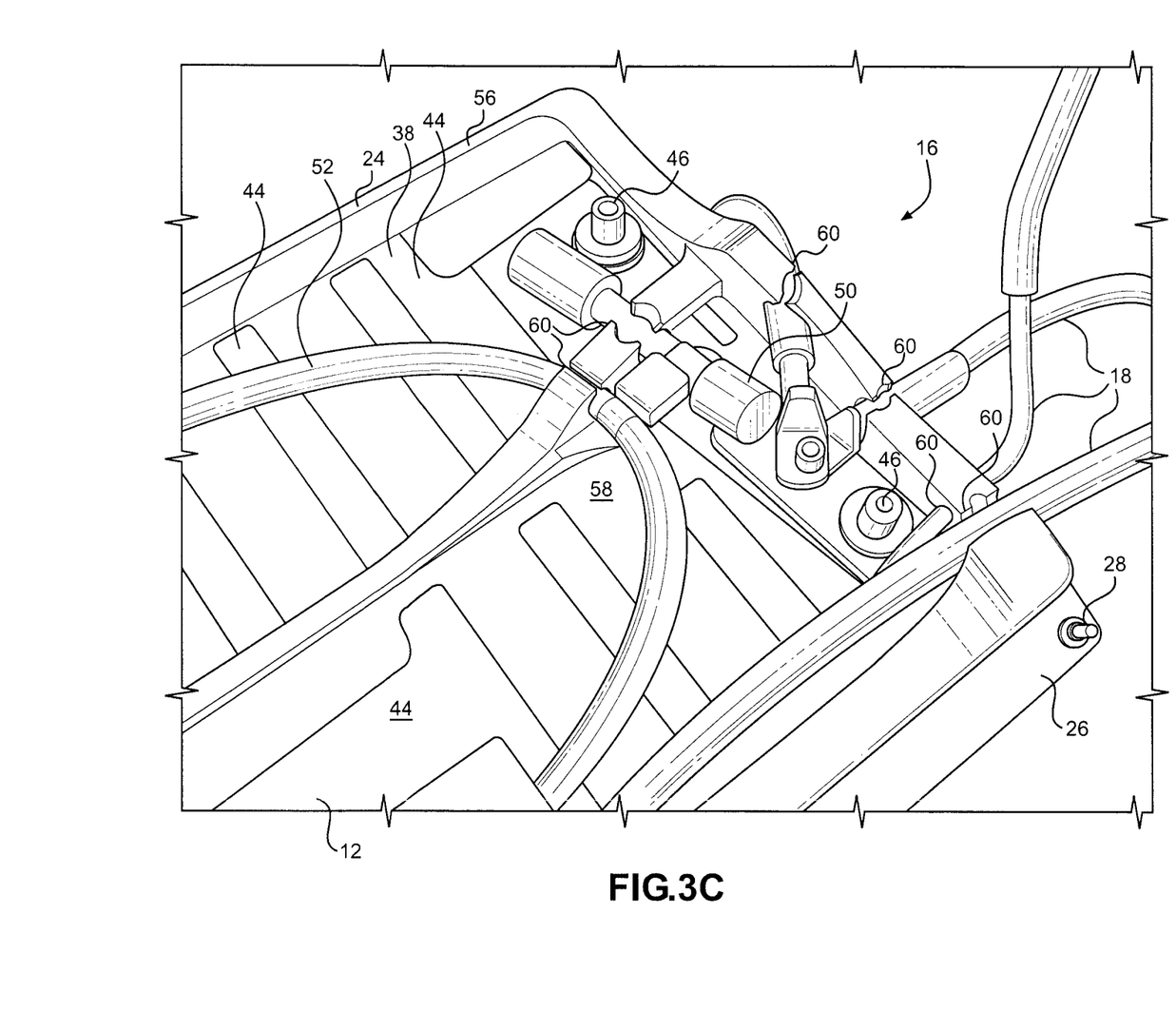

Referring now to FIGS. 3A through 3C, detailed perspective views of the battery array assembly 16 are illustrated with the battery array cover 22 removed to illustrate details of the interface sealing component 24. In this regard, the interface sealing component 24 includes a base member 38 having an upper side 40 arranged to face upwardly toward the battery array cover 22 and matingly engage with the battery array cover 22. The base member 38 also has a lower side 42 arranged to face downwardly toward a plurality of battery surfaces 44 of the plurality of batteries 12 and matingly engage with the plurality of battery surfaces 44 and portions of the hold-down brackets 26. In this embodiment, the batteries 12 are arranged in a 2×2 array, but it should be understood that the interface sealing component 24 and battery array cover 22 may be adapted to be used with a single battery 12, or with any other number or configuration of batteries 12, as desired.

In this embodiment, each battery 12 has a positive terminal 46 and a negative terminal 48, with the batteries 12 interconnected via a plurality of terminal connectors 50 and jumper cables 52. In this embodiment, the batteries 12 are connected in series and in parallel, but it should be understood that different configurations may be used, as desired. A plurality of side members 56 extends around a perimeter of the base member 38 perpendicular to the base member 38 to form an interior volume 58. In this embodiment, the side members 56 may be shaped to matingly engage the battery array cover 22 by contacting shaped surfaces of the side members 56 with complementary surfaces of the battery array cover 22 to fully enclose the interior volume 58 and create an environmental seal around the interior volume 58. An environmental seal may include a liquid-proof seal, a vapor barrier, or similar fluid-impermeable seal capable of keeping outside contaminants from entering the interior volume 58. Similarly, the side members 56 may be shaped to conform to the battery surface 44 by contacting shaped surfaces of the side members 56 with complementary portions of the battery surface 44. The side members 56 in this embodiment may also be sufficiently resilient to conform to complementary surfaces of the battery array cover 22 and/or battery surface 44 under compression when the battery array cover 22 is secured over the batteries 12 to compress interface sealing component 24 therebetween.

The positive terminals 46, negative terminals 48, terminal connectors 50, and jumper cables 52 are positioned on the upper side 40 of the base member 38 within the interior volume 58. In this embodiment, the interior volume 58 is relatively shallow, but it should be understood that the interface sealing component 24 and battery array cover 22 may include an interior volume 58 having a different size or configuration, as desired.

The side members 56 have a plurality of cable apertures 60 each shaped to receive and retain one or more electrical cables 18. In this embodiment, the electrical cables 18 are electrically connected to the respective terminal connectors 50 and extend from the battery array assembly 16 through respective cable apertures 60. In this embodiment, the cable apertures 60 may be closed, to more securely seal the interior volume 58, or open, to facilitate positioning and removal of the electrical cables 18, jumper cables 52, etc., as desired. While cable apertures 60 are used in this embodiment to retain and manage the electrical cables 18, it should be understood that other types of cable management components may be used, including tabs, grooves, and/or cable tie anchors, for example. The electrical cables 18 may be retained and managed by the cable apertures 60 or other cable management components by a friction fit, a compression fit, an adhesive bond, or a gasket member (not shown), for example.

Figure 4A:
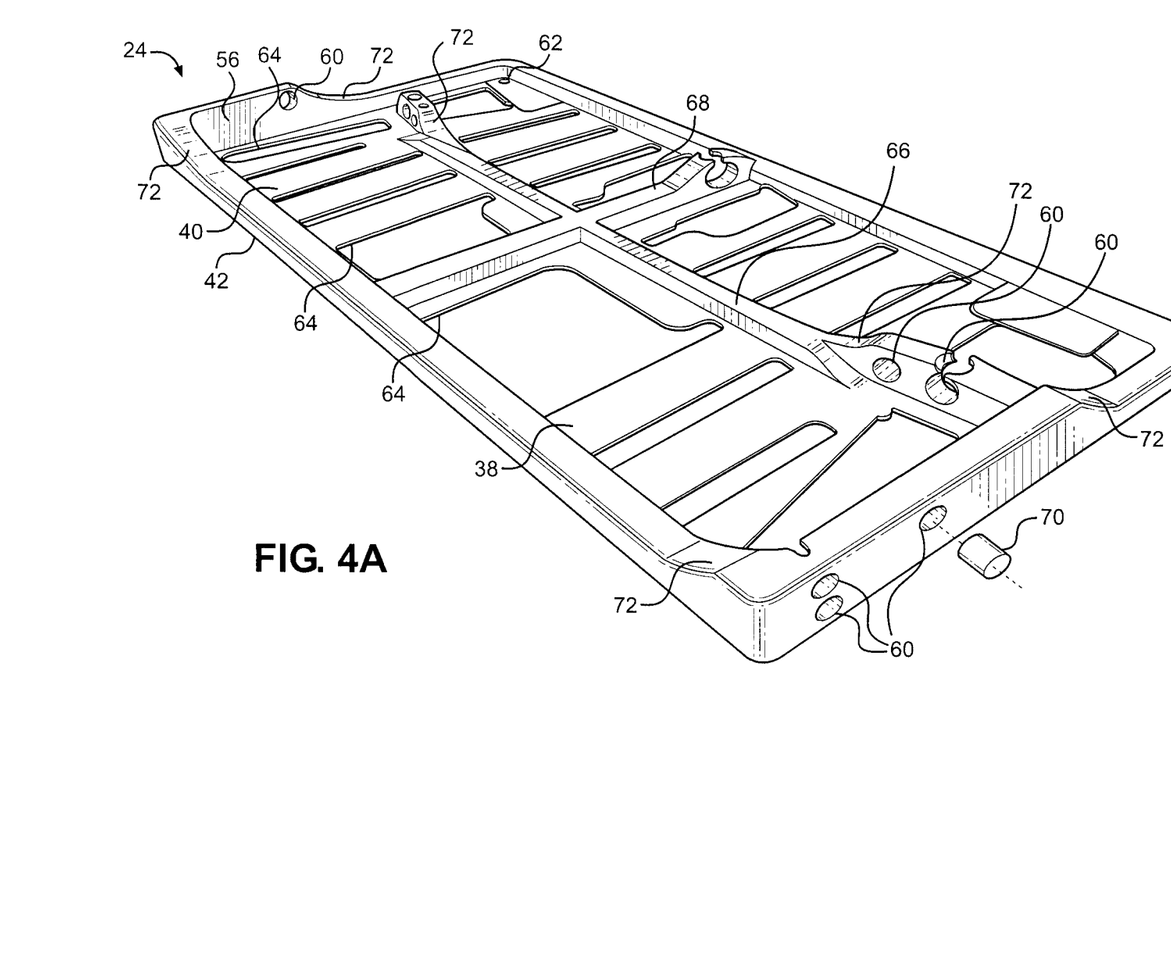
FIGS. 4A and 4B are detailed perspective views of the interface sealing component of FIGS. 1-3C.
Figure 4B:
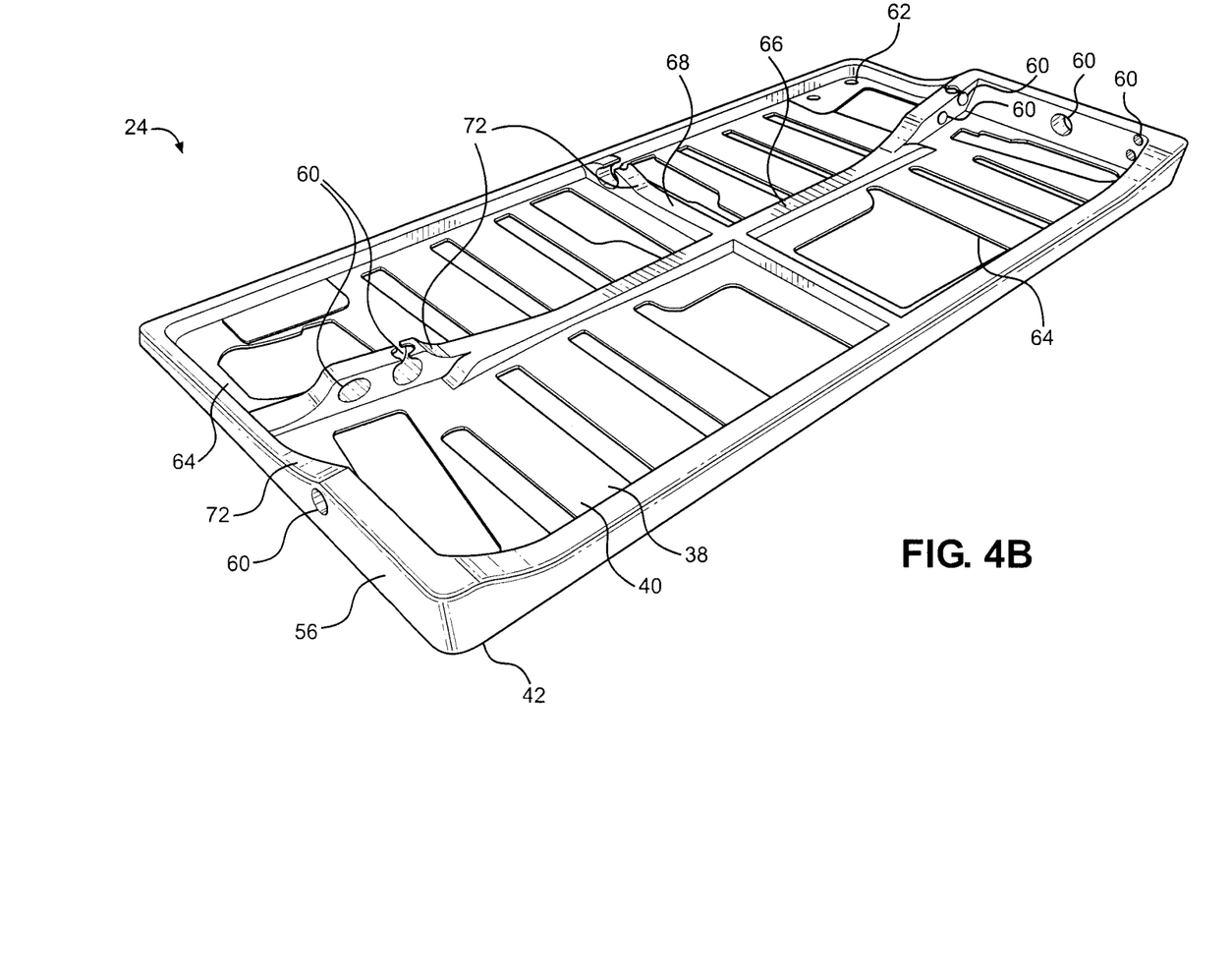

Additional features of the interface sealing component 24 are shown by FIGS. 4A and 4B, which illustrate perspective views of the interface sealing component 24 of FIGS. 1 through 3C. In this regard, the base member 38 may include a plurality of dedicated terminal apertures 62 shaped to receive one of the positive terminal 46 and negative terminal 48 therethrough, and may also include a plurality of larger base apertures 64, which may be sized to receive one or more components of the battery 12 therethrough, including, but not limited to, the positive terminals 46 and negative terminals 48 of the one or more of the plurality of batteries 12. The base apertures 64 may also be shaped and/or sized to reduce the amount of material used by the interface sealing component 24. For example, by removing excess material to form the base apertures 64 in this embodiment, production and/or material costs for the interface sealing component 24 may be reduced while maintaining the structural integrity of the interface sealing component 24.

To further enhance structural integrity, the interface sealing component 24 in this embodiment includes a first rib member 66 and a second rib member 68. The first rib member 66 and the second rib member 68 intersect each other in this embodiment to divide the interface sealing component 24 into four regions corresponding to the four batteries 12 of the battery array assembly 16. The first rib member 66 and the second rib member 68 have several functions in this embodiment. First, as noted above, the first rib member 66 and second rib member 68 provide additional structural integrity to the interface sealing component 24, thereby allowing the base apertures 64 to be larger in size, which in turn may reduce the production and/or material cost of forming the interface sealing component 24. Second, the first rib member 66 and the second rib member 68 are shaped to matingly engage with the battery array cover 22 and the battery surface 44 to form a separate environmental seal for each battery 12, thereby environmentally isolating each positive terminal 46 and negative terminal 48 pair from every other positive terminal 46 and negative terminal 48 pair. One advantage of this arrangement is that if a portion of the battery array cover 22 or the interface sealing component 24 is damaged in a way that exposes the positive terminal 46, negative terminal 48, and/or battery surface 44 of one of the plurality of batteries 12 to the outside environment of the battery compartment 14, the components of the other batteries 12 in the battery array assembly 16 may remain environmentally sealed from the outside environment of the battery compartment 14.

In this embodiment, the first rib member 66 and second rib member 68 each have one or more additional cable apertures 60 formed therein, each cable aperture 60 shaped to retain and manage the various electrical cables 18 and jumper cables 52 (not shown). In this and other embodiments, individual cable apertures 60 may be selectively sealed, for example with a form-fitting aperture plug 70, to maintain the environmental seal of the interface sealing component 24 within the assembled battery array assembly 16. In other embodiments, the interface sealing component 24 and/or battery array cover 22 may be customized during the design phase to include only the cable apertures 60 that are required for a particular configuration. These arrangements permit the interior volume 58 to be more effectively sealed from the environment of the battery compartment 14 or other external environment.

Figure 5:
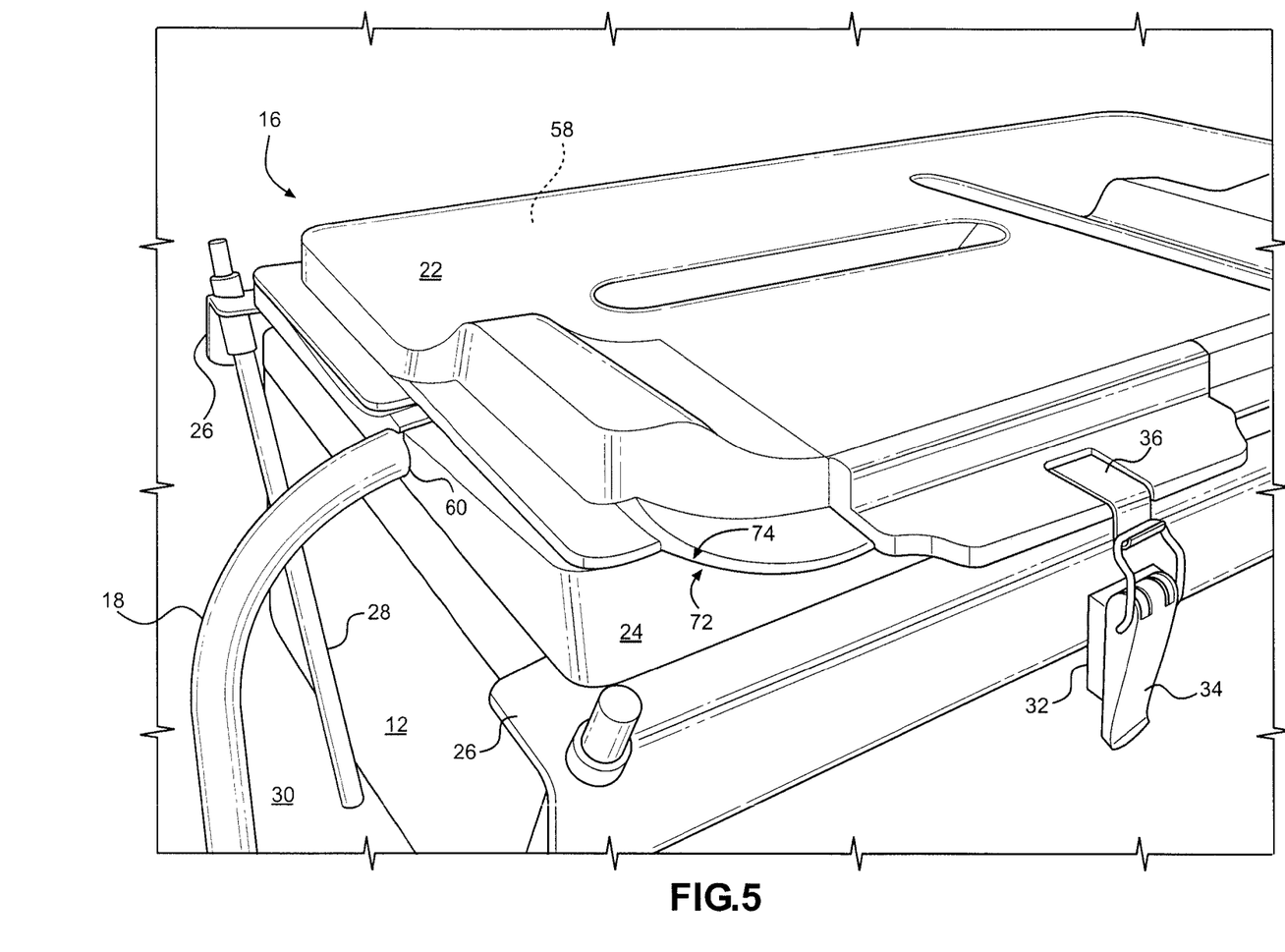
FIG. 5 is a detailed perspective view of the battery array assembly of FIGS. 1-3C illustrating details of the battery array cover.

In this embodiment, the side members 56 of the interface sealing component 24 include a plurality of sloped surfaces 72. Referring now to FIG. 5, which illustrates a detailed perspective view of the battery array assembly 16 assembled with the battery array cover 22, the battery array cover 22 has a plurality of complementary sloped surfaces 74 shaped to engage with the sloped surfaces 72 of the interface sealing component 24, thereby matingly engaging the sloped surfaces 72 of the side members 56 with the complementary sloped surfaces 74 of the battery array cover 22. It should be understood that the interface sealing component 24 and battery array cover 22 can be customized to include other types of complementary surfaces for different applications as desired. For example, different dimensions may be required for the interface sealing component 24 and/or battery array cover 22 to accommodate different gauges of electrical cables 18, and/or to accommodate different configurations of terminal connectors 50 and jumper cables 52.

The interface sealing component 24 in this embodiment is a one-piece unitary component, and may be formed from any suitable material, such as, for example, cast molded polyurethane or other types of molded thermoplastic. Thermoplastics and similar materials are particularly suitable because they are capable of being shaped to conform to complementary surfaces of the battery surfaces 44 and/or battery array cover 22. A thermoplastic interface sealing component 24 may also be sufficiently resilient under typical environmental conditions within the electrical compartment 14 to conform to the complementary surfaces of the battery surfaces 44 and/or battery array cover 22 under compression while retaining its structural integrity. Thermoplastics and similar materials are also generally fluid-impermeable, which facilitates the interface sealing component 24 forming an environmental seal around the interior volume 58. It should be understood that other materials having different properties and configurations may be used.

Figure 6A:
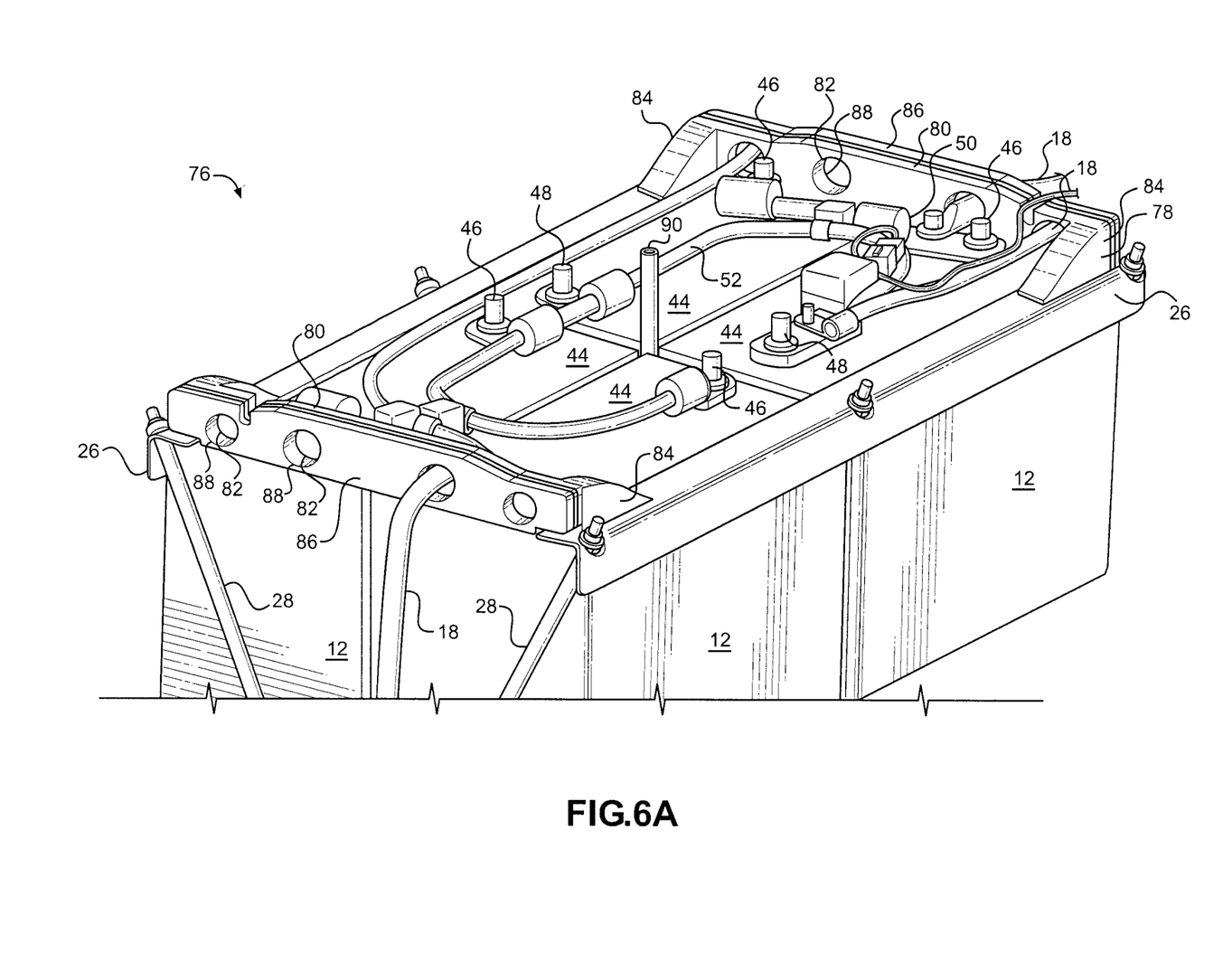
FIGS. 6A and 6B are detailed views of a battery array assembly having a pair of non-unitary interface sealing components according to an alternative embodiment.
Figure 6B:
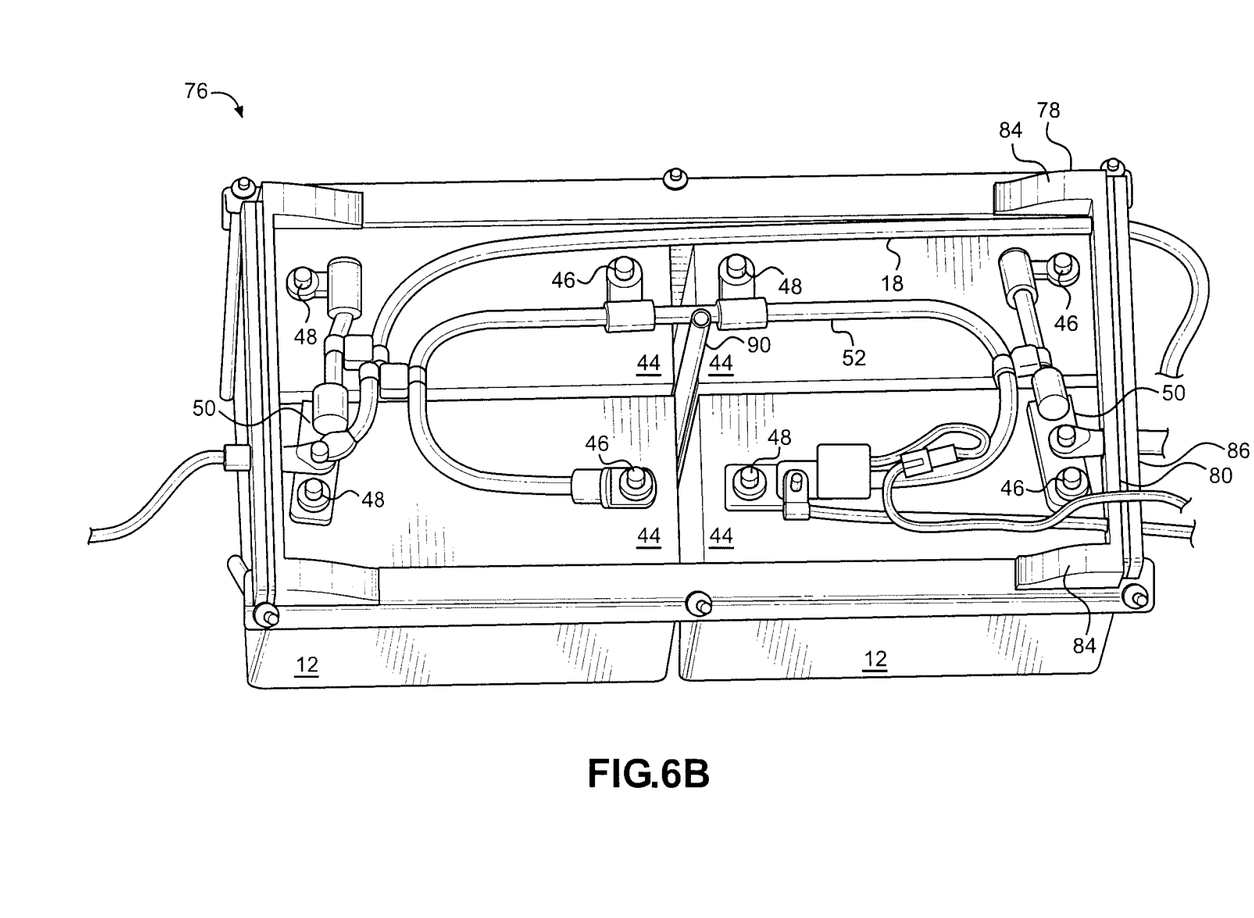
Figure 7:
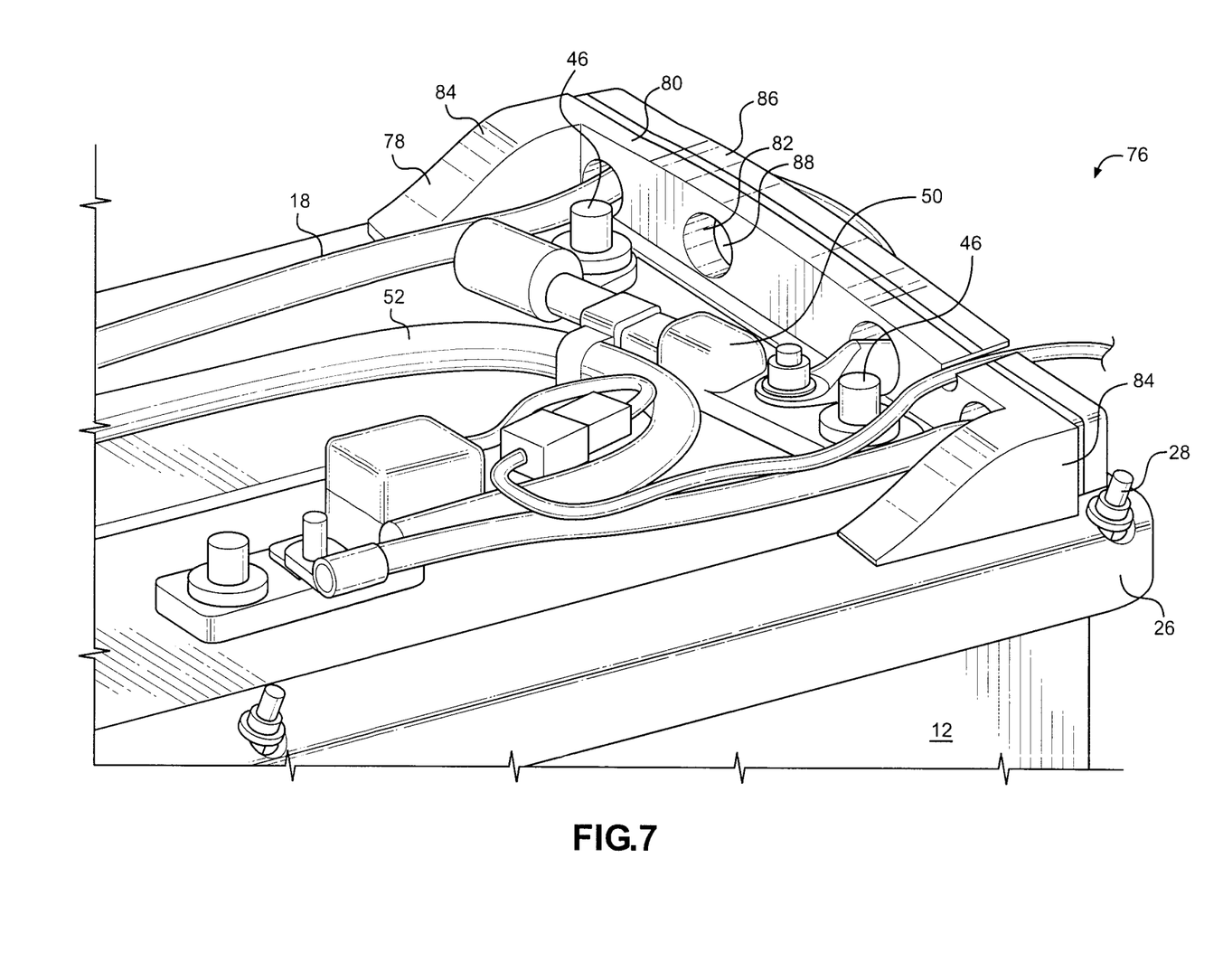
FIG. 7 is a detailed perspective view of one of the non-unitary sealing components of FIGS. 6A and 6B.

In this regard, FIGS. 6A and 6B are detailed perspective views of a battery array assembly 76 according to an alternative embodiment. In this embodiment, the battery array assembly 76 includes a 2×2 array of batteries 12 similar to the battery array assembly 16 of FIGS. 1-5. The batteries 12 are retained on the compartment bed 30 by a pair of L-shaped hold-down brackets 26 and a plurality of hold-down bolts 28. In this embodiment, however, the hold-down brackets 26 form part of an interface sealing component 78, with a pair of end members 80 disposed at opposite ends of the hold-down brackets 26. Each end member 80 is arranged vertically with respect to the pair of hold-down brackets 26. Each end member 80 includes one or more cable apertures 82 for receiving and retaining electrical cables 18 therethrough. Each end member 80 is connected to the hold-down brackets 26 via a pair of interface brackets 84 extending from the end member 80. As shown in greater detail in FIG. 7, the interface sealing component 78 forms an interior volume for accommodating the electrical cables 18, terminal connectors 50, jumper cables 52 and/or other components. As best shown by FIG. 7, the cable apertures 82 of the end members 80 permit electrical cables 18 to extend into the battery array assembly 76. In this embodiment, each end member 80 and its respective pair of interface brackets 84 is formed as a unitary component, but it should be understood that the interface brackets 84 may be alternatively formed separately from the end member 80. In this embodiment, a rigid plate 86 may also be positioned over the end member 80. The rigid plate 86 may provide structural rigidity to the battery array assembly 76 while also providing complementary cable apertures 88 corresponding to the cable apertures 82 of the respective end member 80, to facilitate connecting the battery 12 with the electrical cables 18.

Figure 8:
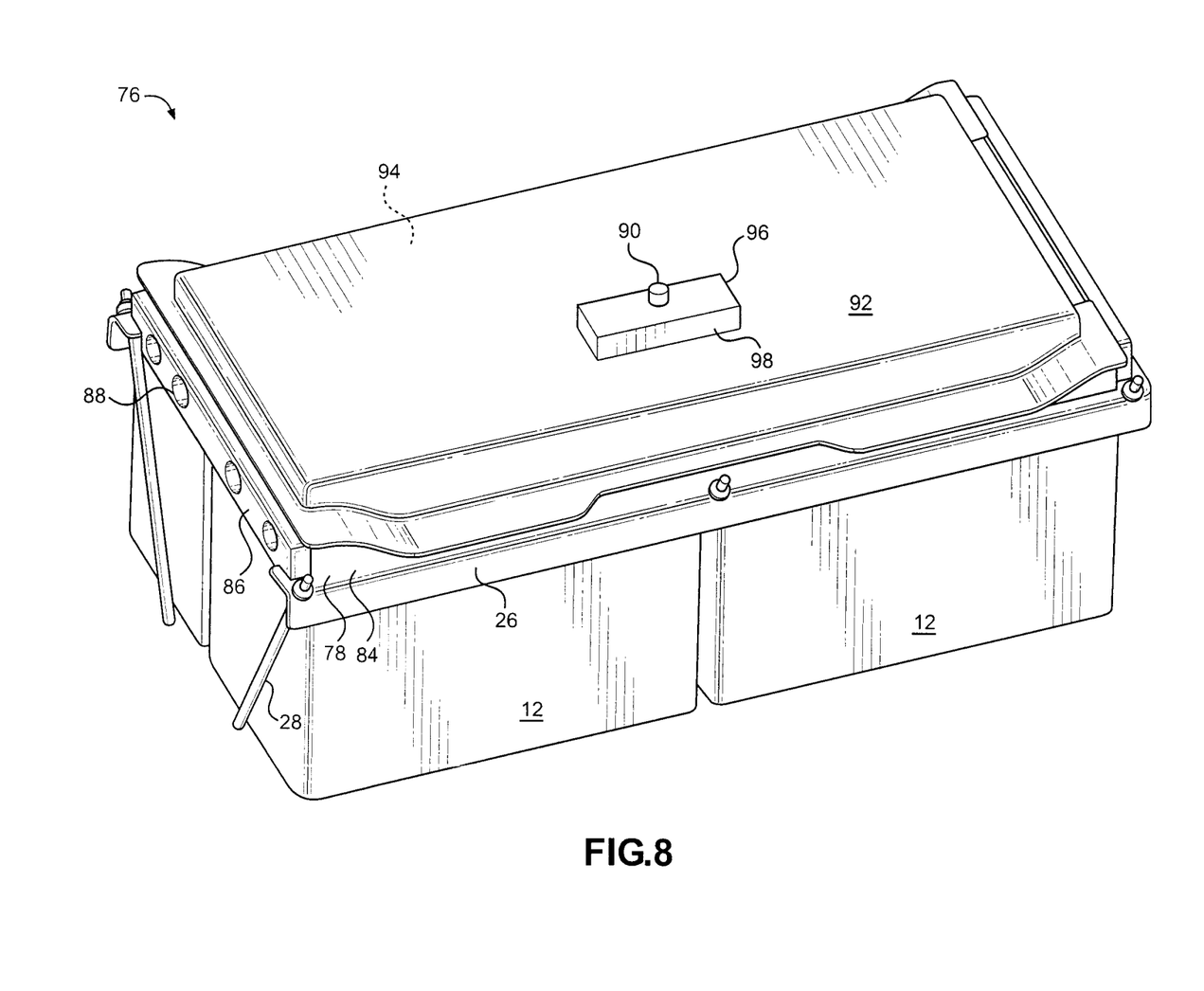
FIG. 8 is a detailed perspective view of the battery array assembly of FIGS. 6A-7 with the battery array cover installed.

Referring now to FIG. 8, the battery array assembly 76 further includes a battery array cover 92 shaped to matingly engage with the end members 80, interface brackets 84, and hold-down brackets 26 to enclose the battery surfaces 44, positive terminals 46, negative terminals 48, terminal connectors 50, jumper cables 52, and/or other components within an interior volume 94 of the battery array assembly 76. In this embodiment, the battery array cover 92 is formed from a relatively rigid material, such as fiberglass for example, to allow a single, centrally located hold-down mechanism 96 to secure the entire battery array cover 92 over the battery array assembly 76 to enclose the interior volume 94. In this embodiment, the hold-down mechanism 96 comprises the hold-down bolt 90 extending through the battery array cover 92 and coupled to the compartment bed 30. The hold-down mechanism 96 in this embodiment also includes a hold-down member 98 coupled to the hold-down bolt 90 over the battery array cover 92 to secure the battery array cover 92 over the interface sealing component 78 and batteries 12, thereby sealing the positive terminals 46, negative terminals 48, terminal connectors 50, jumper cables 52, and/or other components therein.

Figure 9:
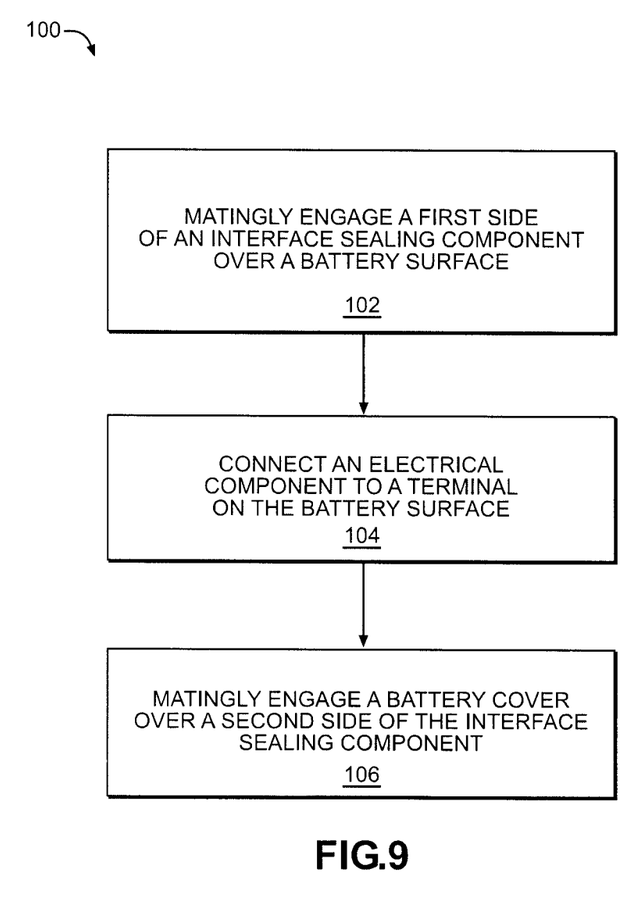
FIG. 9 is a flowchart of a method of sealing an interface between a battery and a battery cover according to an embodiment.

FIG. 9 is a flowchart illustrating a method 100 of sealing an interface between a battery and a battery cover, according to an embodiment. The method 100 comprises matingly engaging a first side of an interface sealing component, such as the interface sealing component 24 of FIGS. 1-5, over the battery surface, such as the battery surface 44 of battery 12 of FIGS. 1-5 (Block 102). The method 100 further comprises connecting an electrical component, such as the electrical cables 18 of FIGS. 1-5, to a terminal on the battery surface (Block 104). The method 100 further comprises matingly engaging a battery cover, such as the battery array cover 22 of FIGS. 1-5, over a second side of the interface sealing component to form an interior volume between the battery surface and the battery cover, such as the interior volume 58 of FIGS. 1-5 (Block 106). Then the battery cover is matingly engaged over the second side of the interior sealing component, the terminal of the battery is enclosed in the interior volume, and the electrical component extends at least partially out of the interior volume. Although reference is made to the embodiment of FIGS. 1-5 with respect to the method 100 for illustrative purposes, it should be understood that method 100 and other disclosed methods are not so limited.

While the invention has been described herein in reference to specific aspects, features, and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Various combinations and subcombinations of the structures described herein are contemplated and will be apparent to a skilled person having knowledge of this disclosure. Any of the various features and elements as disclosed herein may be combined with one or more other disclosed features and elements unless indicated to the contrary herein. Correspondingly, the invention as hereinafter claimed is intended to be broadly construed and interpreted, as including all such variations, modifications and alternative embodiments, within its scope and including equivalents of the claims.

What is claimed is:

1. An interface sealing component for a battery, comprising:
   a base member having a first side and a second side opposite the first side, the first side having a first side surface shaped to conform to a complementary battery surface of a battery, the second side having a second side surface shaped to conform to a complementary surface of a battery cover, the base member shaped to form an interior volume between the battery surface and the battery cover;
   a base aperture formed in the base member, the base aperture shaped to receive a terminal disposed on the battery surface therethrough to enclose the terminal in the interior volume; and
   a cable management component disposed on the second side of the base member, the cable management component shaped to retain a portion of a cable in the interior volume.

2. The interface sealing component of claim 1, wherein the first side surface and the second side surface of the base member are further shaped to environmentally seal the terminal in the interior volume between the battery surface and the battery cover.

3. The interface sealing component of claim 1, wherein the first side surface of the base member is further shaped to conform to another battery surface of another battery arranged in an array.

4. The interface sealing component of claim 1, wherein the terminal comprises a plurality of terminals, the base aperture shaped to receive the plurality of terminals therethrough.

5. The interface sealing component of claim 4, wherein the base aperture comprises a plurality of base apertures, each base aperture shaped to receive at least one of the plurality of terminals therethrough.

6. The interface sealing component of claim 1, further comprising a plurality of side members, each side member coupled to the base member at a respective edge of the base member, the plurality of side members arranged perpendicular to the base member.

7. The interface sealing component of claim 6, further comprising a cable aperture formed in at least one of the plurality of side members, the cable aperture shaped to receive a cable therethrough.

8. The interface sealing component of claim 7, wherein the cable aperture is sized to create an environmental seal between the side member and the cable when the cable is received through the cable aperture.

9. The interface sealing component of claim 7, further comprising an aperture plug shaped to be inserted into the cable aperture to create an environmental seal between the side member and the aperture plug.

10. The interface sealing component of claim 6, further comprising a first rib member coupled to the base member and extending between a first pair of side members of the plurality of side members, the first pair of side members perpendicular to the first rib member.

11. The interface sealing component of claim 10, further comprising a second rib member perpendicular to the first rib member, the second rib member coupled to the base member and extending between a second pair of side members of the plurality of side members, the second pair of side members perpendicular to the second rib member.

12. The interface sealing component of claim 11, wherein the first rib member intersects the second rib member.

13. The interface sealing component of claim 1, the cable management component comprising one of the group consisting of: an aperture, a tab, a groove, and a cable tie anchor.

14. The interface sealing component of claim 1, wherein the base member is formed from molded thermoplastic.

15. The interface sealing component of claim 1, wherein the base member comprises:
   a pair of brackets shaped to extend along opposite edges of the battery, each of the pair of brackets having a first end and a second end; and
   a first end member coupled between the pair of brackets at the first end of each bracket; and
   a second end member coupled between the pair of brackets at the second end of each bracket,
   wherein the pair of brackets, the first end member, and the second end member form the base aperture.

16. The interface sealing component of claim 15, further comprising a cable aperture formed in one of the first end member and second end member, the cable aperture shaped to receive a cable therethrough.

17. The interface sealing component of claim 1, further comprising:
   a plurality of side members, each side member coupled to the base member at a respective edge of the base member, the plurality of side members arranged perpendicular to the base member;
   a cable aperture formed in at least one of the plurality of side members, the cable aperture shaped to receive a cable therethrough, wherein the cable aperture is sized to create an environmental seal between the side member and the cable when the cable is received through the cable aperture;
   a first rib member coupled to the base member and extending between a first pair of side members of the plurality of side members, the first pair of side members perpendicular to the first rib member;
   a second rib member perpendicular to the first rib member, the second rib member coupled to the base member and extending between a second pair of side members of the plurality of side members, the second pair of side members perpendicular to the second rib member, wherein the first rib member intersects the second rib member; and
   a cable management component disposed on the second side of the base member, the cable management component shaped to retain a portion of the cable in the interior volume.

18. A battery cover system comprising:
   an interface sealing component comprising a base member having a first side and a second side opposite the first side and a cable management component disposed on the second side of the base member, the base member forming an aperture; and
   a battery comprising:
      a battery surface matingly engaged with the first side of the interface sealing component; and
      a pair of terminals disposed on the battery surface through the base aperture; and
   a battery cover matingly engaged with the second side of the interface sealing component, wherein interface sealing component, battery surface, and battery cover form an interior volume with the pair of terminals enclosed therein;
   wherein the first side of the interface sealing component has a first side surface shaped to conform to the battery surface, the second side of the interface sealing component has a second side surface shaped to conform to the battery cover;

wherein the cable management component is shaped to retain a portion of a cable in the interior volume.

19. A method of sealing an interface between a battery and a battery cover, the method comprising:

matingly engaging a first side of an interface sealing component over a battery surface the interface sealing component comprising a base member having a first side and a second side opposite the first side and a cable management component disposed on the second side of the base member, the base member forming an aperture, the first side of the interface sealing component has a first side surface shaped to conform to the battery surface;

connecting an electrical component to a terminal on the battery surface; and matingly engaging a battery cover over a second side of the interface sealing component to form an interior volume between the battery surface and the battery cover, wherein the terminal is enclosed in the interior volume and the electrical component extends at least partially outside the interior volume, the second side of the interface sealing component having a second side surface shaped to conform to the battery cover, the cable management component shaped to retain a portion of a cable in the interior volume.

* * * * *